L. E. CURTIS.
MACHINE FOR MAKING EXPANDED METAL.
APPLICATION FILED FEB. 7, 1916.
1,207,716.
Patented Dec. 12, 1916.
5 SHEETS—SHEET 1.
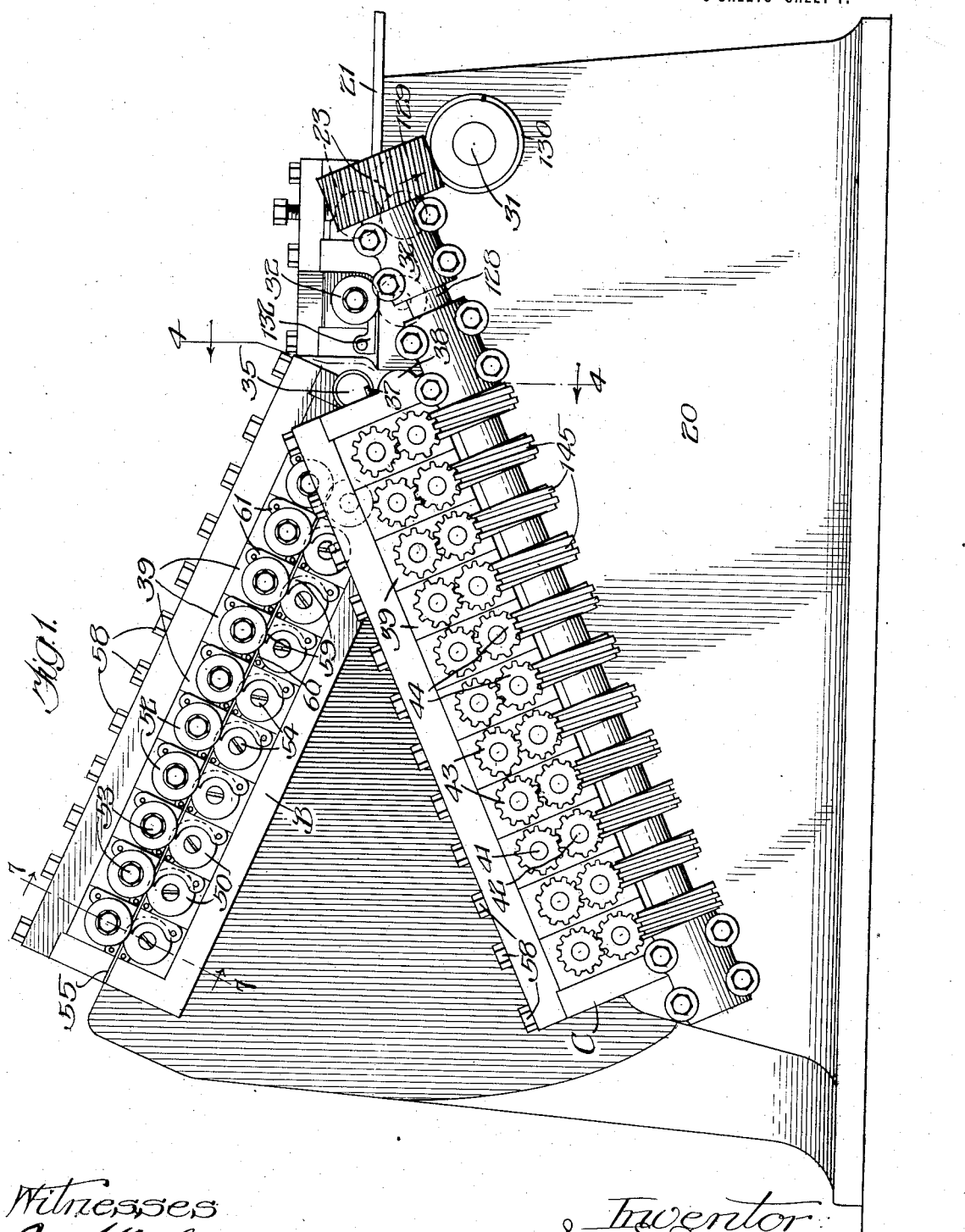

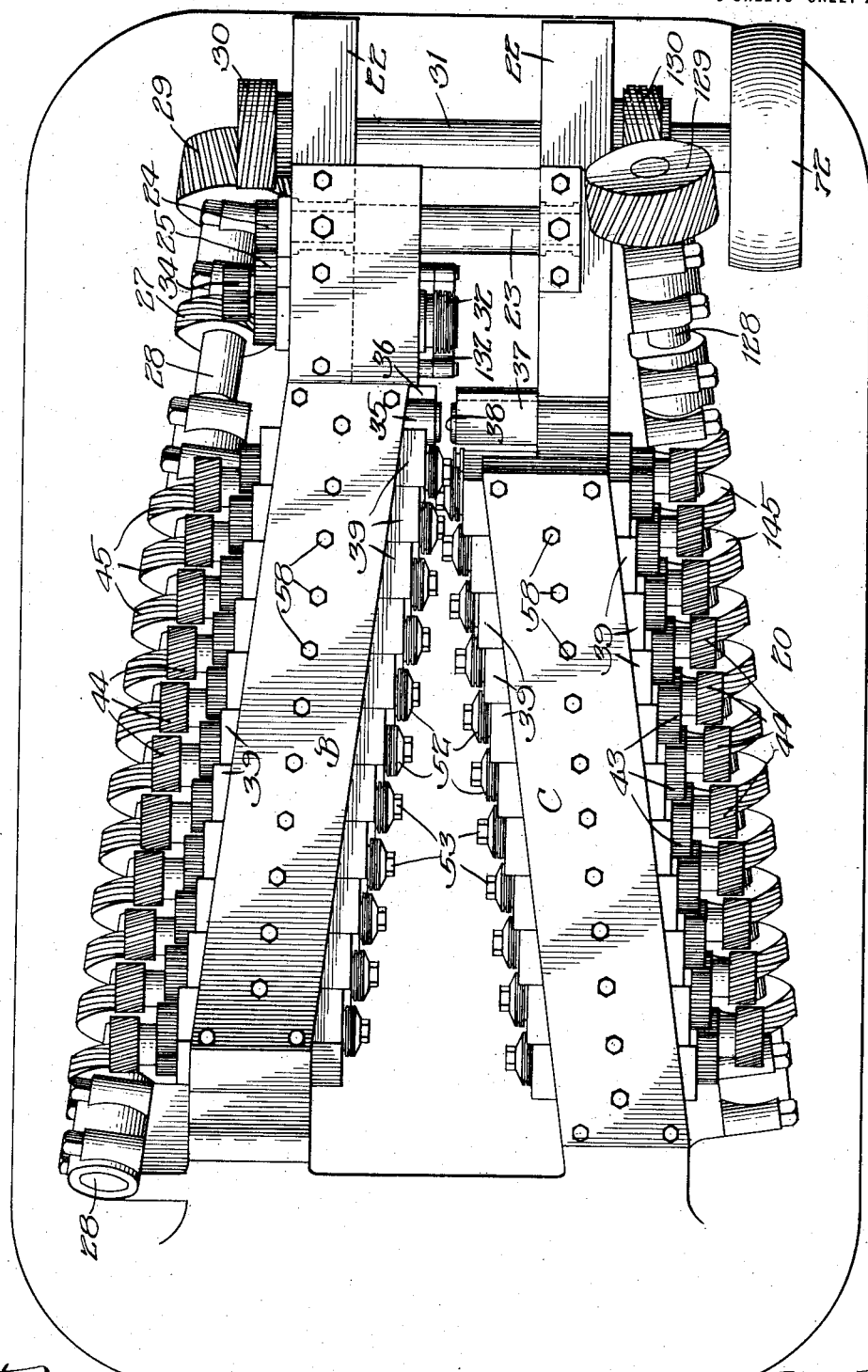

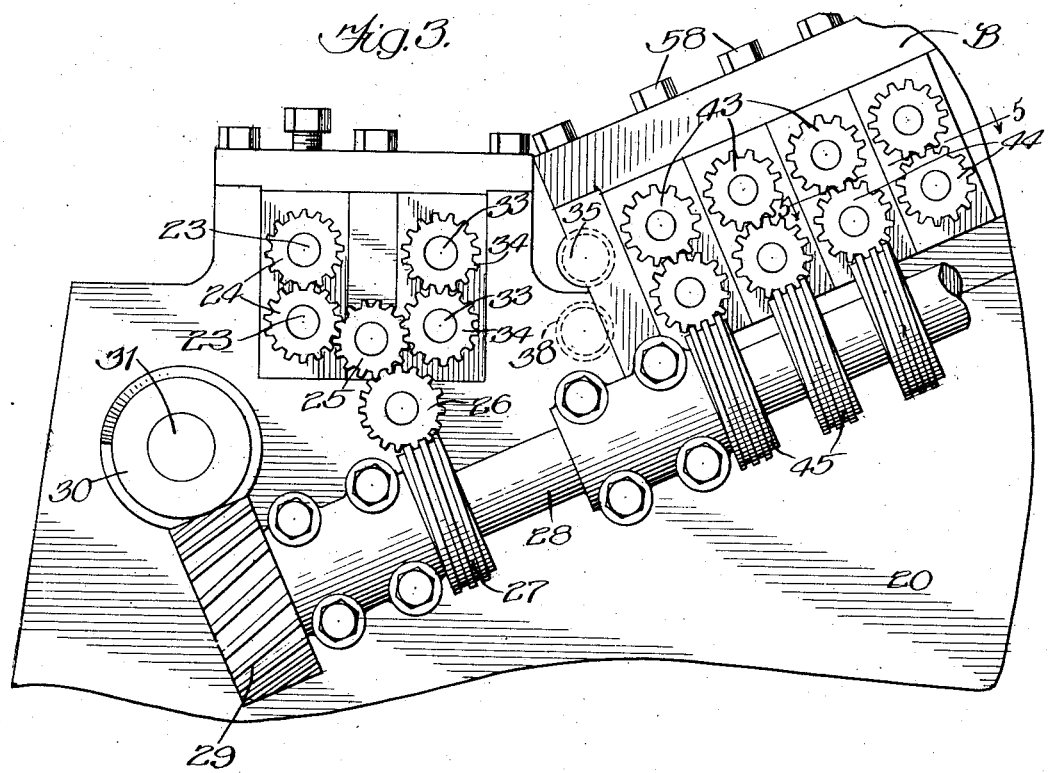
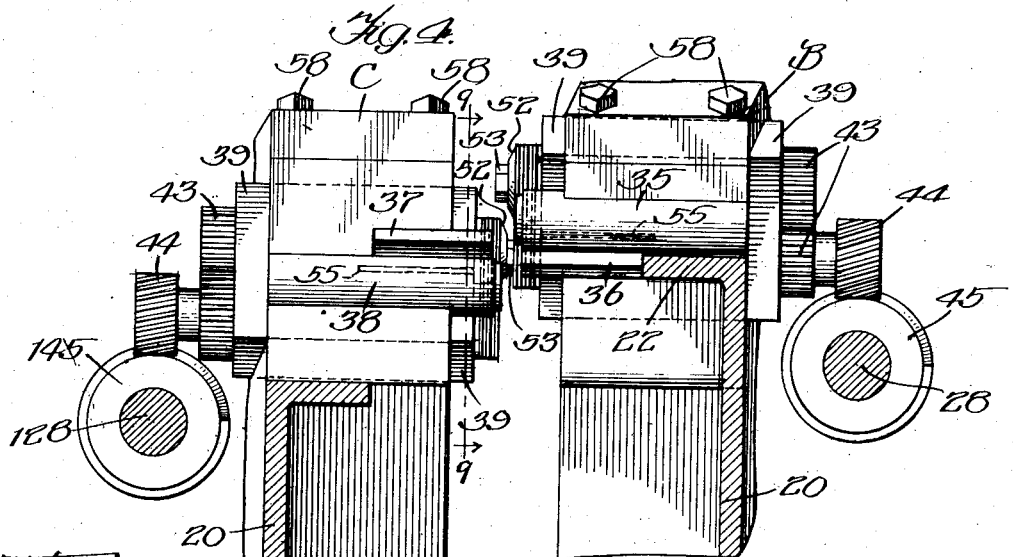

L. E. CURTIS.
MACHINE FOR MAKING EXPANDED METAL.
APPLICATION FILED FEB. 7, 1916.
1,207,716.
Patented Dec. 12, 1916.
5 SHEETS—SHEET 4.
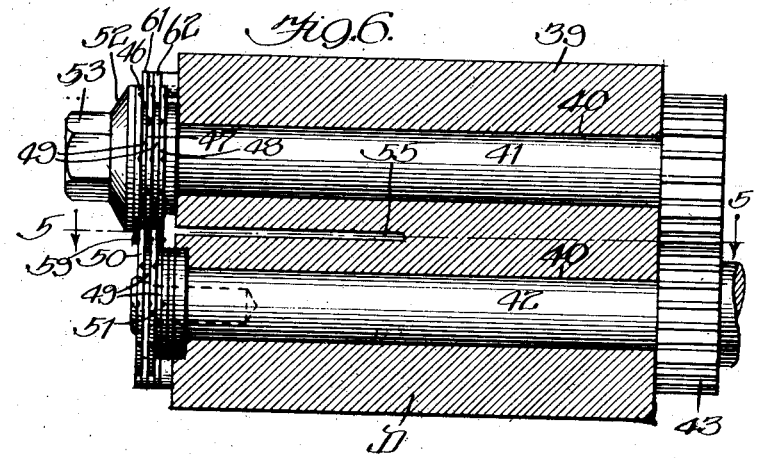
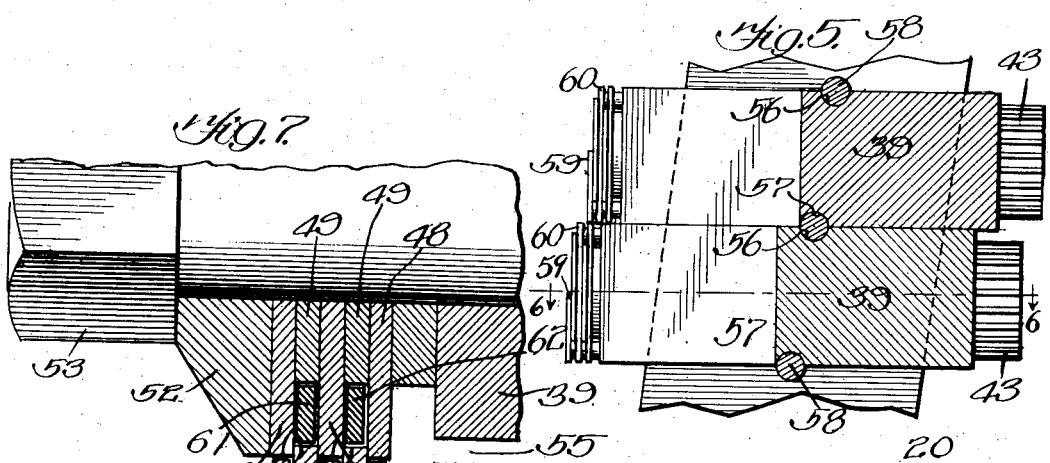
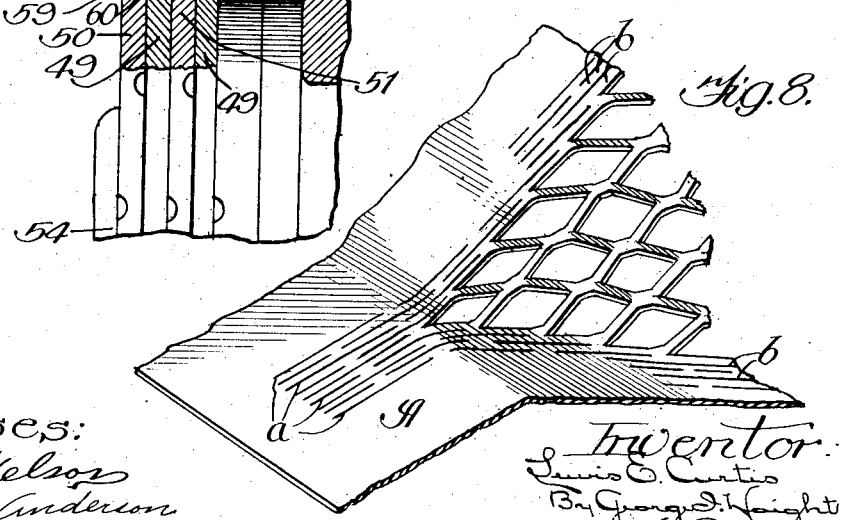

L. E. CURTIS.
MACHINE FOR MAKING EXPANDED METAL.
APPLICATION FILED FEB. 7, 1916.
1,207,716.
Patented Dec. 12, 1916.
5 SHEETS—SHEET 5.
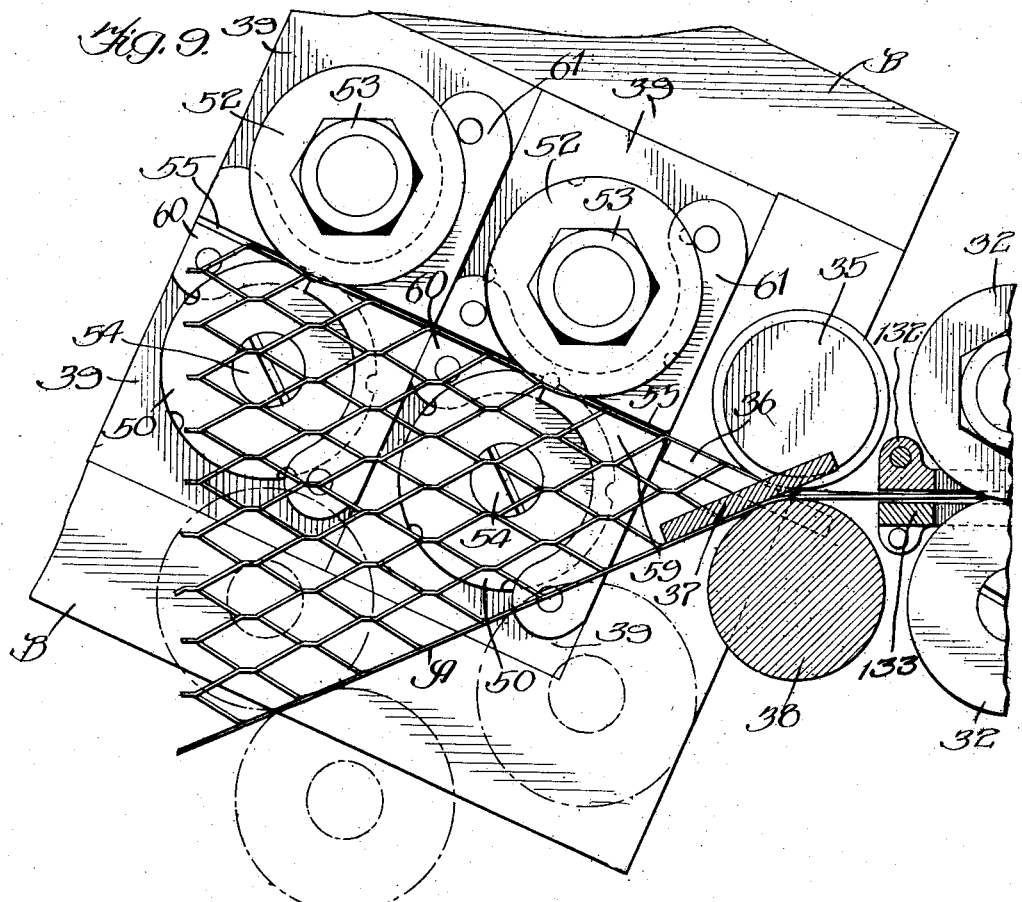
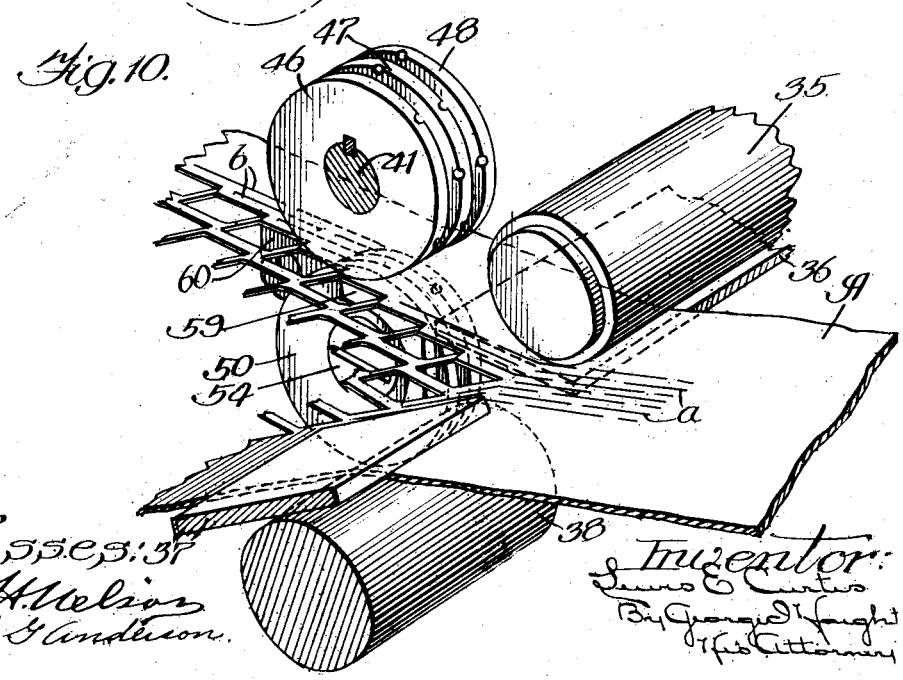

UNITED STATES PATENT OFFICE.

LEWIS E. CURTIS, OF KENILWORTH, ILLINOIS, ASSIGNOR TO AMES STEEL LATH COMPANY, OF ST. LOUIS, MISSOURI, A CORPORATION OF MISSOURI.

MACHINE FOR MAKING EXPANDED METAL.

1,207,716.  Specification of Letters Patent.  Patented Dec. 12, 1916.

Application filed February 7, 1916. Serial No. 76,535.

*To all whom it may concern:*

Be it known that I, LEWIS E. CURTIS, a citizen of the United States, residing at Kenilworth, in the county of Cook and State of Illinois, have invented a certain new and useful Improvement in Machines for Making Expanded Metal, of which the following is a full, clear, concise, and exact description, reference being had to the accompanying drawings, forming a part of this specification.

This invention relates to improvements in machines for making expanded metal.

Objects of this invention are, to provide an expanded metal making machine of more efficient operation than those heretofore employed; to provide a machine of less initial cost and less cost for maintenance than those heretofore employed; to provide a machine of the character described occupying less floor space than those heretofore used; and to provide a machine so arranged that only small portions of the sheet are slitted at a time and immediately expanded whereby the sheet is always in a condition to be most efficiently operated upon.

The invention furthermore consists in the improvements in the parts and devices and in the novel combinations of the parts and devices as herein shown, described and claimed.

In the drawing forming a part of this specification, Figure 1 is a side elevation of a machine embodying my improvements. Fig. 2 is a top plan view of the machine illustrated in Fig. 1. Fig. 3 is an enlarged, detail side elevation of a portion of the machine to more clearly illustrate the driving mechanism, the elevation being the opposite side of that illustrated in Fig. 1. Fig. 4 is a transverse, vertical section taken substantially on the line 4—4 of Fig. 1. Fig. 5 is a sectional view through two adjacent units of the cutting and expanding means, hereinafter described and taken substantially on the line 5—5 of Fig. 3. Fig. 6 is another sectional view of one of said units, the section being taken vertically and substantially on the line 6—6 of Fig. 5. Fig. 7 is a detail sectional view upon an enlarged scale illustrating one of the sets of cutting and expanding means including the slitting disks and strippers, the section being taken approximately on the line 7—7 of Fig. 1. Fig. 8 is a detail perspective view of a portion of a sheet, showing the same after it has passed the first slitting means and has begun to be operated upon by the first two sets of the slitting and expanding means. Fig. 9 is a vertical sectional view upon an enlarged scale, taken substantially on the line 9—9 of Fig. 4. Fig. 10 is a perspective view, upon an enlarged scale, to more clearly illustrate the means for deflecting the portions of the sheet to the respective slitting and expanding means and the action of slitting and expanding the sheet.

In said drawing, 20 denotes any suitable form of base casting or bed plate on which the other parts of the machine are mounted. As shown, the sheet to be operated upon enters the machine at the right hand end as viewed in Fig. 1, along the table 21. The table 21 is provided with suitable edge guides 22—22 for the sheet as it progresses along the table 21, and extending across said table are upper and lower feed rolls 23—23 mounted on suitable shafts having their ends extended to the side of the machine as indicated in Fig. 3. These shafts are provided with meshing gears 24—24, one of which in turn meshes with a pinion 25 driven by a gear 26, which in turn meshes with a worm 27 mounted on an upwardly inclined driving shaft 28, the latter being mounted in suitable bearings at its ends and also intermediate its ends, as clearly appears from Figs. 2 and 3. The drive shaft 28 is driven by a worm gear 29 at its lower end which meshes with another worm gear 30 mounted on a transverse power shaft 31 adapted to be driven by a pulley 72 or other suitable means, see Fig. 2. After the sheet passes through the feed rollers 23, it passes between a pair of notched slitting rollers 32—32, said slitting rollers 32 being located so as to slit the sheet A with preferably eight strands $a$—$a$ at the center of the sheet, as clearly indicated in Figs. 2 and 8. As will be understood, the strands $a$ are united by staggered bonds in the usual manner, I not deeming it necessary to describe more in detail the notched cutting rolls for doing this inasmuch as this type of cutter is well known. It will also be understood that no expansion of the metal or opening up of the meshes occurs at this point in the travel of the advancing sheet A. As clearly appears from Fig. 9, upper and lower slotted stationary strippers 132 and 133 are associated with the notched slitting rolls 32 to properly strip the metal from said rolls. The slitting rolls 32 are mounted on transversely extending shafts 33—33, see Fig. 3, and are provided with meshing gears 34—34, the lower one of which is also meshed with the pinion 25. After passing the preliminary cutting rolls 32—32, the sheet is fed to two series of divergently arranged combined slitting and expanding means, more particularly hereinafter described. One of these series extends upwardly from the original horizontal plane of the sheet and also outwardly from the center line of the machine. The other series extends downwardly from the original horizontal plane of the sheet and also outwardly from the center line of the machine on the opposite side to that of the first series. In order to feed the sheet properly to the two series of slitting and expanding means, hereinbefore referred to, I have provided two sets of deflecting means, one set comprising an upper roller 35 and an upwardly inclined plate 36 immediately beneath the roller 35, and the other set comprising a downwardly inclined stationary plate 37 and a roller 38 beneath the same and adjacent thereto, see Figs. 9 and 10. With this arrangement, the right hand half of the sheet A, as viewed in Fig. 10, is deflected upwardly around the roller 35 and the left hand half of the sheet A is deflected downwardly around the roller 38.

After passing the sheet deflecting means, hereinbefore described, the respective halves of the sheet are acted upon by the upwardly extending series of slitting and expanding means B and the downwardly extending series of slitting and expanding means C. Inasmuch as each of the series of slitting and expanding means B and C comprises the same elements operating in the same manner except that the positions are, of course, reversed, I will only describe one series. Referring to the series of slitting and expanding means B, the same preferably comprises eleven units D, shown in detail in Figs. 5, 6 and 7. Each unit D comprises a block 39, rectangular in cross section and having two parallel bores 40—40 therein through which extend an upper shaft or spindle 41 and a lower shaft or spindle 42. At their outer ends the shafts or spindles 41 and 42 are provided with meshing gears 43 and the lower shaft or spindle 42 is extended and provided with a worm gear 44 which meshes with a worm 45 on the drive shaft 28, see Figs. 3 and 4. As will be understood, the drive shaft 28 is provided with as many worms 45 as there are units D, so that all the spindles or shafts 41 and 42 will be positively driven. It will also be understood that on the opposite side of the machine, a downwardly inclined drive shaft 128 is provided which corresponds to the drive shaft 28, said shaft 128 being also provided with a series of worms 145 for driving the corresponding shafts of the series C. The drive shaft 128 is provided at its upper end with a worm gear 129 which meshes with a worm gear 130 on the power shaft 31.

Referring again to the structure illustrated in Figs. 5, 6 and 7, it will be noted that the upper shaft or spindle 41 carries three notched slitting disks 46, 47 and 48 spaced by washers or spacing rings 49—49 and the lower spindle or shaft 42 carries two similar notched slitting disks 50 and 51, also spaced by washers 49—49. The disks 46, 47 and 48 are keyed or otherwise suitably attached to the spindle 41 so as to rotate therewith and are held in position by a clamp washer 52 and nut 53. The other disks 50 and 51 are keyed or otherwise non-rotatably secured to the spindle 42 and are held in place by a countersunk screw 54. Each of the disks 46—51 are preferably provided with five notches, the notches being staggered in the usual manner so as to alternate the bonds connecting the strands which will be formed as the sheet passes between said cutting disks which are over-lapped, as clearly shown in Fig. 7. Each of the blocks 39, as appears in Fig. 6, is provided with a groove 55 through which the portion of the sheet not operated upon is adapted to pass. By referring to Fig. 5, it will be seen that each of the blocks 39 is also provided with semi-circular grooves 56 and 57 on opposite sides thereof, said semi-circular grooves being offset to correspond with the offsetting of each of the units D so that the semi-circular groove 57 of one block will aline with the semi-circular groove 56 of the adjacent block when the parts are in proper position and thereby permit the use of bolts 58—58 to hold the units in position, it being understood that the bolts 58 pass through a top plate 59 and into a portion of the bed plate or base casting 20, whereby the units D are held in proper position.

By referring to Figs. 7, 9 and 10, it will be seen that a plurality of strippers is associated with each set of notched slitting disks. With the lower set of disks 50 and 51 there is provided an outer relatively short stationary stripper 59 and two longer stationary strippers 60—60, one being located between the disks 50 and 51 and the other on the inner side of the disk 51. Associated with the upper cutting disks are corresponding strippers 61 and 62 located on opposite sides of the notched disk 47. Each set of cutting disks of each unit D will slit four bonded strands $b$—$b$, see Fig. 8, one set of the strands $b$ being formed by the upwardly inclined series at one side of the strands $a$ which are first formed, and the other set of four strands *b* being formed on the opposite side and adjacent to the strands *a*.

As clearly appears in the plan view of Fig. 2, the sets of combined slitting and expanding means are progressively offset from the center line of the machine a distance corresponding to the width of four strands so that as the sheet progresses through the machine, the sheet will be slitted and immediately expanded in successive portions four strands wide at gradually increasing distances from the center of the sheet until the sheet reaches the end sets of slitting and expanding means at which point the outer portions of the sheet A are finally slitted and expanded. It is believed that the showing in Figs. 9 and 10 will clearly illustrate this operation, it being understood that the sheet is pulled down over the lower sets of cutting disks of the series B and pulled up over the upper disks of the sets comprising the series C. It is on account of this operation that the countersunk screws 54 are employed with one of the sets of cutting disks of each unit in order to avoid interference with the sheet as it progresses through the machine. By positively driving all the notched slitting disks of the two series B and C, I avoid the necessity of employing separate means for advancing the sheet, since these slitters will perform that function themselves.

By arranging the mechanism as hereinbefore described, it will be observed that the slitting rolls 32 may be made relatively small as compared with prior constructions where it has been necessary to slit the sheet across its entire width, because in my arrangement only a small portion of the sheet is slitted at this stage in the operation. Furthermore, it will be noted that only small portions of the sheet are slitted at a time and immediately expanded thereby leaving the remaining portions of the sheets uncut and therefore in better condition to be manipulated or fed forwardly. In other words, with my mechanism only those portions of the sheet which are to be immediately opened up or expanded are slitted. It will also be noted that the entire machine is relatively short and occupies only a small floor space and by employing the small notched slitting disks of the divergent series B and C the cost of maintenance is reduced since these slitting disks may be made relatively cheap and in the event the same become worn may be thrown away and replaced at small cost, whereas, in prior constructions, where large slitting rolls have been employed to slit the entire sheet before it is expanded, grinding of the slitting rolls was required because of the expense of the same which prevented throwing the same away and replacing them by new ones.

I have herein shown and described what I now consider the preferred embodiment of my invention but the same is merely illustrative, and I contemplate all changes and modifications that come within the scope of the claims appended hereto.

I claim:

1. In a machine for making expanded metal, means for slitting portions of a sheet on opposite sides of the longitudinal center thereof and immediately opening up the slitted portions, said means being so arranged that successive portions of the sheet from the center thereof outwardly to the edges are slitted and opened up until the entire sheet has been expanded.

2. In a machine for making expanded metal, two series of divergently arranged means for successively slitting and expanding adjacent portions of a sheet as the latter progresses through the machine, said series of means diverging in a direction from the entrance to the exit end of the machine.

3. In a machine for making expanded metal, two series of divergently arranged means for successively slitting and expanding adjacent portions of a sheet as the latter progresses through the machine, said means operating progressively on portions of the sheet from the center thereof out toward the edges.

4. In a machine for making expanded metal, two series of divergently arranged means for successively slitting and expanding adjacent portions of a sheet as the latter progresses through the machine, said means also acting to feed the sheet forwardly, said series of means diverging in a direction from the entrance to the exit end of the machine.

5. In a machine for making expanded metal, two series of slitting and expanding means arranged divergently in a direction from the entrance to the exit end of the machine to operate on successive portions on opposite sides of the center line of the sheet as it passes through the machine.

6. In a machine for making expanded metal, two series of slitting and expanding means arranged divergently to operate on successive portions on opposite sides of the center line of the sheet as it passes through the machine, said series of means being arranged to operate on said portions outwardly from the center of the sheet as the latter moves forwardly.

7. In a machine for making expanded metal, two series of slitting and expanding means arranged divergently to operate on successive portions on opposite sides of the center line of the sheet as it passes through the machine, said means also being adapted to feed the sheet forwardly while being slitted and expanded, said series of means diverging from the points where the same first operate on the sheet to the points where the sheet is last operated upon thereby.

8. In a machine for making expanded metal, two series of slitting and expanding means arranged divergently to operate on successive portions on opposite sides of the center line of the sheet as it passes through the machine, each of said means including rotatable cutting disks and strippers, said series of means diverging from the points where the same first operate on the sheet to the points where the sheet is last operated upon thereby.

9. In a machine for making expanded metal, two series of divergently arranged means for successively slitting and expanding adjacent portions of a sheet as the latter progresses through the machine, said means diverging in a plane extending diagonally of the original plane of the sheet as fed to the machine.

10. In a machine for making expanded metal, means for slitting a sheet along the central portion only thereof; and two series of slitting and expanding means to which the sheet is fed after passing said slitting means, said series of slitting and expanding means being arranged to operate progressively on successively adjacent portions of the sheet on opposite sides of the central portion of the sheet which is first slitted, as the sheet passes through the machine.

11. In a machine for making expanded metal, means for slitting a sheet along the central portion only thereof; and two series of slitting and expanding means to which the sheet is fed after passing said slitting means, said series of slitting and expanding means being arranged to operate progressively on successively adjacent portions of the sheet on opposite sides of the central portion of the sheet which is first slitted, as the sheet passes through the machine, said slitting and expanding means also feeding the sheet forwardly.

12. In a machine for making expanded metal, means for slitting a sheet along the central portion only thereof; and two series of slitting and expanding means to which the sheet is fed after passing said slitting means, said series of slitting and expanding means being arranged to operate progressively on successively adjacent portions of the sheet on opposite sides of the central portion of the sheet which is first slitted, as the sheet passes through the machine, said series of slitting and expanding means being divergently arranged from the front end of the machine to the rear end thereof.

13. In a machine for making expanded metal, notched slitting rolls arranged to slit the centrally located portion of a sheet; and two series of notched rotatable slitting disks at the rear of said rolls, said disks being arranged to operate on successively farther apart portions of a sheet on opposite sides of said previously slitted central portion of the sheet.

14. In a machine for making expanded metal, notched slitting rolls arranged to slit the centrally located portion of a sheet; two series of notched rotatable slitting disks at the rear of said rolls, said disks being arranged to operate on successively farther apart portions of a sheet on opposite sides of said previously slitted central portion of the sheet; and strippers associated with said slitting disks.

15. In a machine for making expanded metal, notched slitting rolls arranged to slit the centrally located portion of a sheet; and two series of notched rotatable slitting disks at the rear of said rolls, said disks being arranged to operate on successively farther apart portions of a sheet on opposite sides of said previously slitted central portion of the sheet, said slitting disks being positively driven and thereby adapted to feed the sheet forwardly.

16. In a machine for making expanded metal, slitting rolls arranged to slit the central portion of a sheet into bonded strands; two series of divergently arranged slitting and expanding means at the rear of said rolls, one of said series extending upwardly and the other downwardly from the original plane of the sheet; and means located between said slitting rolls and said slitting and expanding means, for deflecting one side of a sheet upwardly and the other side downwardly as the sheet passes to the first of said series of slitting and expanding means.

17. In a machine for making expanded metal, the combination with a feed table having feed rollers for advancing the sheet, of slitting rolls for slitting the sheet into bonded strands at the central portion thereof, and two series of divergently arranged, positively driven, combined slitting, expanding and feeding means to which the sheet is fed after passing said first slitting means.

18. In a machine of the character described, the combination with a bed plate, of two series of combined slitting and expanding units, one series extending upwardly and outwardly from the center line of the machine and the other series downwardly and outwardly from the center line of the machine, each unit comprising two sets of overlapped notched slitting disks and stationary strippers associated therewith.

19. In a machine of the character described, the combination with a feed table, of notched slitting rolls located at the middle of said table and adapted to slit a central portion only of the sheet, two series of divergently arranged means beyond said slitting rolls adapted to slit and expand the sheet progressively, and sheet deflecting means between said slitting rolls and said divergently arranged series of slitting and expanding means.

20. In a machine of the character described, the combination with notched slitting rolls arranged to slit the central portion only of a sheet, of means for deflecting one portion of the sheet downwardly and another portion of the sheet upwardly after passing said slitting rolls, and two divergently arranged series of means for slitting the remainder of the sheet and expanding the sheet.

21. In a machine of the character described, a combined slitting and expanding unit, said unit comprising a block having a pair of parallelly arranged rotatable spindles therein, overlapped notched disks fixed to the ends of said shafts, and stationary strippers associated with said disks, said strippers extending between the disks.

22. In a machine of the character described, the combination with a feed table, of slitting means located at the center of the table and adapted to slit a central portion only of a sheet into bonded strands, oppositely arranged deflecting means at the end of said table, one of said means deflecting a portion of the sheet upwardly and the other a portion of the sheet downwardly, and two series of divergently arranged, combined slitting, expanding and feeding means to which the sheet is fed after passing said deflecting means, each of said series of combined slitting, expanding and feeding means including sets of overlapped notched disks, the sets being successively offset from the center of the machine distances corresponding to the widths of the portions of the sheet which are slit and expanded by the respective sets.

In witness that I claim the foregoing I have hereunto subscribed my name this 26th day of January 1916.

LEWIS E. CURTIS.

Witness:
JOSEPH HARRIS.